United States Patent [19]

Losic et al.

[11] Patent Number: 5,001,770

[45] Date of Patent: Mar. 19, 1991

[54] SYNTHESIS OF IMPROVED ZERO-IMPEDANCE CONVERTER

[76] Inventors: Novica A. Losic, 7802-23 Avenue, Kenosha, Wis. 53140; Ljubomir D. Varga, Deskaseva 6, 11000 Beograd

[21] Appl. No.: 457,158

[22] Filed: Dec. 26, 1989

[51] Int. Cl.$^5$ .............................................. H02P 7/00
[52] U.S. Cl. .................................. 388/811; 388/815; 318/811; 318/812
[58] Field of Search .............................. 373/285–287; 363/21, 97; 318/615–618, 650, 798, 807, 811, 812; 388/825–829, 830–831, 804, 811, 809–815

[56] References Cited

U.S. PATENT DOCUMENTS

| | | | |
|---|---|---|---|
| 4,293,812 | 10/1981 | Kubach et al. | 323/272 |
| 4,456,872 | 6/1984 | Froeschle | 363/21 X |
| 4,491,777 | 1/1985 | Beck et al. | 318/571 |
| 4,578,631 | 3/1986 | Smith | 323/285 X |
| 4,672,518 | 6/1987 | Murdock | 363/80 X |
| 4,704,568 | 11/1987 | Beck et al. | 318/687 |
| 4,876,494 | 10/1989 | Duggett et al. | 318/568.22 |

*Primary Examiner*—William M. Shoop, Jr.
*Assistant Examiner*—David Martin

[57] ABSTRACT

A method of synthesizing a system which forces a finite value of an impedance to zero comprising positive current feedback of exactly specified nature and value of its transfer function and an internal negative voltage feedback ensuring inherent stability of the system. The converter is used to synthesize electric motor drive systems, incorporating any kind of motor, of infinite disturbance rejection ratio and zero-order dynamics and without position and velocity feedback.

10 Claims, 1 Drawing Sheet

SYNTHESIS OF IMPROVED ZERO-IMPEDANCE CONVERTER

FIELD OF THE INVENTION

This invention relates to circuits and systems and more particularly to electric motor drive systems using improved zero-impedance converter to provide for an infinite disturbance rejection ratio and a zero-order dynamics and not having a position and velocity feedback.

BACKGROUND OF THE INVENTION

In order to reduce effects due to a nonzero impedance, it is of interest to minimize the impedance. Further, in order to achieve mathematically complete, and therefore ideal, load invariant operation, it can be shown that an impedance of interest should be forced to zero. All known techniques produce less or more successful minimization of the impedance of interest, as a rule in a proportion to their complexity. None of the presently known techniques produces a zero impedance, except a synthesis method described in a copending and coassigned application by these same two inventors Lj. Dj. Varga and N. A. Losic, entitled "Synthesis of Zero-Impedance Converter", filed December 1989. A specific and particular applications of a zero-impedance converter, in addition to those in the application above, are described in the U.S. Pat. No. 4,885,674, entitled "Synthesis of Load-Independent Switch-Mode Power Converters" by Lj. Dj.Varga and N. A. Losic, issued December 1989, as well as in a two copending and coassigned applications of N. A. Losic and Lj. Dj. Varga, entitled "Synthesis of Load-Independent DC Drive System", U.S. patent application Ser. No. 07/323,630, November 1988, and "Synthesis of Load-Independent AC Drive Systems", U.S. patent application Ser. No. 07/316,664, February 1989 (allowed for issuance December 1989).

In all these applications, the zero-impedance converter, as a potentially unstable system, is made stable by necessarily closing a negative feedback loop(s) around the zero-impedance converter, those loops belonging to a system to which the zero-impedance converter is being applied. For example, in applying a zero-impedance converter to synthesizing load-independent switch-mode power converters an outer negative voltage feedback loop is closed around the zero-impedance converter by sampling the switch-mode power converter output voltage and feeding it back in the negative feedback loop. In applying a zero-impedance converter to synthesizing load-independent electric motor drive systems, a negative velocity and position feedback loops are closed around the zero-impedance converter by employing appropriate sensing devices, e.g. tach and encoder.

While closing the outer negative voltage feedback loop in case of a switched power converters incorporating zero-impedance converter is necessary, i.e., it is not redundant, the closing of negative velocity and position loops, in case of electric motor drives incorporating zero-impedance converter, can be avoided by improvement of the zero-impedance converter. Furthermore, and as suggested in a copending and coassigned application by N. A. Losic and Lj. Dj. Varga, entitled "Synthesis of Drive Systems of Infinite Disturbance Rejection Ratio and Zero-Dynamics/Instantaneous Response", U.S. patent application Ser. No. 07/468,122, January 1990, for case of a zero-impedance converter, the improved zero-impedance converter may be used to provide for a synthesis of drive systems of the same properties as above but without the need for closing position and velocity loops.

SUMMARY OF THE INVENTION

It is therefore an object of the present invention to provide a synthesis method to produce an improved zero-impedance converter to achieve an infinite disturbance rejection ratio and to apply it to achieve a zero-order dynamics, with associated instantaneous response to an input command, in electric motor drive systems with any kind of motor including dc, synchronous and asynchronous ac, and step motors, and without the need for closing position and velocity loops. These applications are by no means exclusive; the improved zero-impedance converter can be used in any application which can make use of its properties. As it will be shown, the improved zero-impedance converter can be built as a self sufficient and inherently stable entity and as such incorporated within any system of interest.

Briefly, for use with an electric motor drive system, the preferred embodiment of the present invention includes a positive current feedback loop within an internal negative voltage feedback loop, with a current feedback circuit, incorporated in the positive current feedback loop, of transfer function H(s) synthesized such that its nominator is equal to the impedance of interest, $Z_{ekv}(s)$, while its denominator is equal to a modified transresistance of the current feedback loop, $RAK/[-1+AK_eK_f]$, whereas the current sensed is the current through the impedance of interest, $Z_{ekv}(s)$ (to be forced to zero). The transfer function of the current feedback circuit, as the algorithm for the synthesis of improved zero-impedance converter, therefore is $$H(s) = Z_{ekv}(s)/\{RAK/[1+AK_eK_f]\} \quad (1)$$

where $Z_{ekv}(s)$ is the impedance of an electric motor, R is transresistance of a current sense device, A is voltage gain of a PWM control and power stage, K is gain constant of a buffering amplifier in the current loop, $K_e$ is gain constant in the motor voltage feedback loop, and $K_f$ is gain constant in a forward path of the modified zero-impedance converter ($[1+AK_eK_f]$ is amount of feedback of the voltage loop).

The improved zero-impedance converter, whose algorithm is given in Eq.(1), provides for an infinite disturbance rejection ratio, i.e., load independence, of an electric motor drive system incorporating it. It also reduces the order of denominator of a system transfer function making possible to further reduce this order to zero, i.e., to provide for a transfer function equal to a constant, by incorporating a two feedforward algorithms in the drive system as given in Eqs.(2) and (3)

$$K_i = mK_mK_e \quad (2)$$

$$K_i' = mK_m/A \quad (3)$$

where $K_i$ is a gain constant in a forward path of the drive system, $K_i'$ is a gain constant in a feedforward path of the drive system, m is a constant providing scaling between input and output of the system, i.e., the system transfer function becomes m, and $K_m$ is a constant characterizing back electromotive force (emf) of an electric motor.

The ability to provide a self sufficient and inherently stable zero-impedance converter which can be used as an autonomous entity in forcing an impedance to zero is a material advantage of the present invention. By forcing an inductive impedance (as in electric motors) to zero, an instantaneous change of current through the inductive impedance can be effected. Alternatively, an instantaneous change of voltage across a capacitive impedance can be achieved using the improved zero-impedance converter. By forcing a: electric motor impedance to zero, the improved zero-impedance converter provides for an infinite disturbance rejection ratio, i.e., load independence, of the drive system and makes it possible to further synthesize the drive system of a zero-order dynamics and without velocity and position feedback loops, which is another advantage of the present invention.

Other advantages of the present invention include its ability to be realized in an integrated-circuit form; the provision of such a method which does not employ negative voltage feedback loop(s) except its own, and ultimately simplified, negative voltage feedback loop; the provision of such a method which provides zero output-angular-velocity/position-change-to-load-torque-change transfer function in both transient and steady state; and the provision of such a method which provides constant output-angular-velocity/position-change-to-input-command/reference-change transfer function in both transient and steady state.

As indicated by Eq.(1), the circuit realization of the block in the positive current feedback loop is a direct and explicit function of the impedance of interest, $Z_{ekv}(s)$. The two feedforward algorithms, as indicated by Eqs.(2) and (3), are realized as a constant-gain circuits.

The algorithms in Eqs.(1), (2), and (3) also imply that the improved zero-impedance converter operates in its own domain without being concerned with the actual internal working mechanisms of an electric motor such as producing the torque or generating the back electromotive force (these mechanisms shown in an equivalent circuit of a machine), while the feedforward algorithms, used to provide for a constant transfer function of the system, need knowledge about back electromotive force production. The improved zero-impedance converter, as seen from Eq.(1), operates independently of an equivalent circuit of electric motor; it uses information only about an equivalent impedance of motor, $Z_{ekv}(s)$. Also, the algorithms in Eqs.(1), (2), and (3) are independent on a system moment of inertia, and thus on a mass, as well as on a viscous friction coefficient, implying infinite robustness of a drive system with respect to the mechanical parameters, of course, within physical limitations of the system. This implies a possibility of ultimate simplification in controlling a high-performance electric motor drive system by ultimately simplifying a control algorithms used and, at the same time, achieving an infinite disturbance rejection ratio and a zero-order dynamics, the performance characteristics not previously attained.

These and other objects and advantages of the present invention will no doubt be obvious to those skilled in the art after having read the following detailed description of the preferred embodiment which is illustrated in the FIGURE of the drawing.

DETAILED DESCRIPTION

Figure 1:
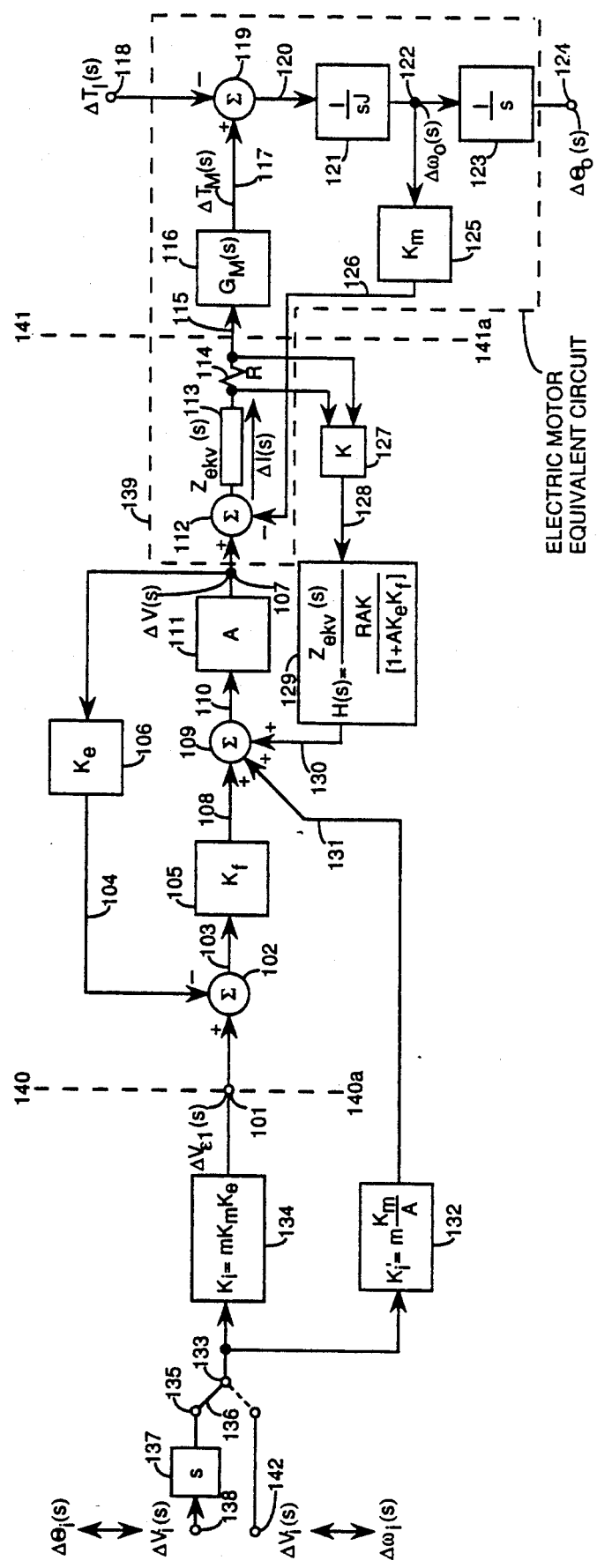
FIG. 1 is a block and schematic diagram of the preferred embodiment of the invention.

An improved zero-impedance converter embodying the principles of the invention applied to synthesizing electric motor drive systems of infinite disturbance rejection ratio and zero-dynamics/instantaneous response is shown in FIG. 1. In FIG. 1, it is assumed that input voltage $V_{in}$ (not illustrated) applied to a pulse width modulated )PWM) power stage within block 111 is constant so that a gain constant A characteristics transfer function of the PWM control and power stage 111. The power stage within block 111 is implemented appropriately for the kind of motor which it powers; for example, it may be a dc-to-dc converter for dc motors or dc-to-ac converter for ac motors or a PWM power stage employed for driving step motors (in this latter case some additional circuits may be used without affecting the embodiment ). The PWM control portion within block 111 then performs appropriate control function. What is of interest here is that the overall voltage gain of the control and power PWM stage 111 is a constant A. Thus, a signal applied to lead 110 is voltage-amplified A times to appear as voltage $\Delta V(s)$ on lead 107 with an associated power/current $\Delta I(s)$ supplied by the input voltage source $V_{in}$.

In FIG. 1, portion between boundaries 140-140a and 141-141a denotes improved zero-impedance converter; the remaining portion illustrates an application of the improved zero-impedance converter in synthesizing an electric motor drive system of infinite disturbance rejection ratio and zero-dynamics/instantaneous response.

The improved zero-impedance converter employs a positive current feedback loop and a negative voltage feedback loop. The positive current feedback loop incorporates a current feedback circuit 129 whose transfer function is H(s). Either analog or digital (microprocessor) realization of the current feedback circuit 129 may be done. The negative voltage feedback loop incorporates a voltage feedback circuit 106 whose transfer function is a constant $K_e$. The purpose of the positive current feedback loop is to synthesize the improved zero-impedance converter with respect to a motor impedance 113 whose value $Z_{ekv}(s)$ is forced to zero for the transfer function H(s) synthesized as given in Eq.(1) and shown in FIG. 1, as it will be explained shortly. The purpose of the negative voltage feedback loop is to stabilize the system in an inherent and self sufficient manner so that it can be used as an autonomous entity in any application.

In operation, the current $\Delta I(s)$ through an electric motor impedance 113 of value $Z_{ekv}(s)$ is sensed by a current sense device 114 whose transresistance is R. The electric motor impedance 113 is a series connection of a resistance and an inductive reactance in case of a dc, synchronous ac, and step motors. In case of asynchronous ac motor (induction motor) this impedance consists of a series connection of a stator impedance and an impedance obtained as a parallel connection of a magnetizing reactance and a rotor impedance referred to stator. The current $\Delta I(s)$ provides a motor developed torque $\Delta T_M(s)$ by means of a torque-producing mechanisms represented by a block 116 of transfer function $G_M(s)$. In case of n-phase motors, a total current $\Delta I(s)$ is understood to be on lead 115 as an input to block 116, and the improved zero-impedance converter, between boundaries 140-140a and 141-141a, is assumed to be per-phase based. The Laplace-transformed function $G_M(s)$ is used to denote the torque producing mechanisms of any electric motor even though in some motors the torque production is a nonlinear process. The justification for this linearized model in block 116 is in that the function $G_M(s)$ does not play any role in functioning of the algorithm of the preferred embodiment of FIG. 1, as it will be shortly derived. The motor developed torque $\Delta T_M(s)$, available on lead 117, is opposed by a load torque $\Delta T_L(s)$, supplied externally at point 118. This opposition takes place in an algebraic summer 119. The difference between the two torques, $\Delta T_M(s) - \Delta T_L(s)$, is supplied by lead 120 to a block 121 which denotes transformation from a torque to an angular shaft speed, and whose transfer function is $1/sJ$, where J is a system moment of inertia. Normally, block 121 has a transfer function $1/(sJ+B)$ where B is a viscous friction coefficient. However, as it is easily shown, the algorithm of the improved zero-impedance converter is independent on the viscous friction coefficient as well as it will be shown that it is independent on the system moment of inertia implying infinite robustness of the system employing the improved zero-impedance converter with respect to these mechanical parameters. An angular shaft speed $\Delta\omega_o(s)$ is produced at point 122 while an angular shaft position $\Delta\theta_o(s)$, obtained by integration of the speed in block 123, is available at point 124. A counter electromotive force (back emf) is produced on lead 126 which opposes a voltage applied to the motor $\Delta V(s)$ available at point 107. This opposition is represented by subtracting the back emf from the voltage applied to the motor in an algebraic summer 112. For a constant air-gap flux in an electric motor, regardless of the type of motor, the back emf is produced in proportion to the angular speed where the proportionality constant is denoted $K_m$ in the preferred embodiment and is drawn as a block 125 in FIG. 1. The negative voltage feedback loop is closed through a voltage feedback circuit 106 characterized with a gain $K_e$ which supplies a voltage feedback signal on lead 104. The voltage feedback signal is subtracted in a summer 102 from a direct path signal $\Delta V_{ei}(s)$ supplied at point 101 which is input of the improved zero-impedance converter. A voltage error signal is thus produced at the output lead 103 of the summer 102 and it is passed through a forward circuit 105 of gain $K_f$. The forward circuit 105 outputs a forward control signal and supplies it to a summing circuit 109 by means of lead 108. The direct path signal $\Delta V_{ei}(s)$ is provided at the output of a direct path circuit 134 characterized by a gain $K_i$. The input of the direct path circuit is connected to a point 133 to which also is connected input of a feedforward circuit 132 characterized by a gain $K_i'$. The output of the feedforward circuit is fed in a positive manner into the summing circuit 109 by means of a lead 131. A switch 136 connects point 133 to either a point 135 or a terminal 142. The point 135 is at the output of a differentiator circuit 137 which performs a Laplace-denoted differentiation characterized by a transfer function s. The differentiator circuit is fed from a terminal 138 by a position voltage command $\Delta V_i(s)$ corresponding to an input position command $\Delta\theta_i(s)$. A velocity voltage command $\Delta V_i(s)$ corresponding to an input velocity command $\Delta\omega_i(s)$ is applied at the terminal 142. Thus, whether the switch 136 is thrown to connect the rest of the system to an input position command $\Delta\theta_i(s)$ or to an input velocity command $\Delta\omega_i(s)$, the system receives an appropriate velocity command via point 133.

The voltage representative of a motor current, $R\Delta I(s)$, is buffered by a differential amplifier 127 whose gain constant is K. The output of the isolating/buffering amplifier 127 is connected via lead 128 to a current feedback circuit 129 whose transfer function is $H(s)$. The current sense signal obtained and processed in this way is then added in the positive feedback manner via lead 130 to the forward control signal, available on lead 108, and to a feedforward signal, available on lead 131. The resulting total control signal, obtained by summing in the positive feedback manner the current sense signal processed by the current feedback circuit 129, with both forward and feedforward signal, is applied by lead 110 to a pulse width modulation (PWM) control and power stage 111 where it is voltage amplified A times appearing as voltage $\Delta V(s)$ at point 107 which in actuality is a voltage supplied to the motor and which creates motor current $\Delta I(s$ through the motor equivalent impedance $Z_{ekv}(s)$.

The implementation of the PWM control and power stage 111 is irrelevant for the functioning of the preferred embodiment of FIG. 1. It is only the voltage gain A of block 111 which is involved in the algorithms of the preferred embodiment. It is understood that signals associated with the summing circuit 109, i.e., signals on leads 108, 131, 130, and 110, are compatible in that they are: a dc varying signals in case of a dc motor; a sinusoidal signals of the same frequency in case of an ac motor; and a pulse signals of the same rate is case of a step motor (which produces an angular shaft speed $\Delta\omega_o(s)$ proportional to this rate of pulses). Further, the signals associated with the summer 102, i.e., signals on leads 101, 104, and 103, are compatible in the same way in which the signals associated with the summing circuit 109 were described above. Therefore, signals on leads 101, 104, and 103 are a dc varying signals in case of a dc motor; a sinusoidal signals of the same frequency in case of an ac motor; and a pulse signals of the same rate in case of a step motor. Thus, for a pulse width modulated power stage within block 111, it is assumed that a fundamental ac waveform and a pulsed waveform filtered from the actual pulse width modulated waveform $\Delta V(s$ are fed back through block 106 in the negative voltage feedback loop, for cases of ac and step motors, respectively. This lowpass filtering provides the fundamental component of the PWM voltage $\Delta V(s)$ or the pulsed waveform free of the pulse width modulation in the respective cases of ac or step motors, and it is assumed that the filtering is performed prior to feeding the block 106. In case of a dc motors, the filtering is also performed to provide an average (dc) voltage from the pulse width modulated motor voltage $\Delta V(s)$ and thus a dc (varying) signal is fed through the voltage feedback circuit 106. The assumed lowpass filtering in any of these cases is not illustrated in the preferred embodiment of FIG. 1.

In the same sense, the command voltage applied to the input of the direct path circuit 134 and to the input of the feedforward circuit 132, is a dc varying voltage in case of a dc motor; a sinusoidal voltage of frequency equal to the fundamental component of the PWM voltage $\Delta V(s)$ in case of an ac motor; and a pulse voltage at the rate of pulses equal to the rate of pulses proportional to which a step motor developes its angular shaft speed $\Delta\omega_o(s)$, in case of a step motor.

The scaling factor m in blocks 132 and 134 has units in [radian/second/Volt] for the velocity voltage command $\Delta V_i(s)$ corresponding to the input velocity command $\Delta \omega_i(s)$, i.e., for $\Delta V_i(s) \rightarrow \Delta \omega_i(s)$, (switch 136 connects point 133 to terminal 142). In case of $\Delta V_i(s)$ corresponding to the input position command $\Delta \theta_i(s)$ i.e., $\Delta V_i(s) \rightarrow \Delta \theta_i(s)$, (switch 136 connects point 133 to point 135), the scaling factor m has units in [radian/Volt], but, due to the differentiating operator s in block 137, which is in [1/second] units, the effective dimensioning is identical and equal to [rad/sec/Volt] in both cases. The back emf constant $K_m$ in blocks 125, 132, and 134 has units in [Volt/rad/sec]. Since the voltage-gain blocks 106 and 111, characterized by constant $K_e$ and A, respectively, are dimensionless, it follows that blocks 132 and 134, characterized by a transfer functions that will shortly be derived and which are shown in the preferred embodiment of FIG. 1 as $K_i' = mK_m/A$ and $K_i = mK_mK_e$, are also dimensionless, representing voltage-gain circuits. Also dimensionless are gains of blocks 105 and 127, having values of $K_f$ and K, respectively. The current feedback circuit 129, characterized by a transfer function that will be shortly derived and shown in the preferred embodiment of FIG. 1 as $H(s) = Z_{ekv}(s)/[RAK/(1+AK_eK_f)]$ is thus also dimensionless and is a voltage-gain circuit.

The portion in FIG. 1 within broken line, referred to with numeral 139, represents an electric motor equivalent circuit where $G_M(s)$ denotes a torque production mechanisms on the basis of a current supplied to the motor and $K_m$ denotes a back emf production mechanisms which, for constant air-gap flux, as mentioned, produce a voltage proportional to the angular shaft speed to oppose the voltage supplied to the motor, $\Delta V(s)$. It should be understood that the back emf results into a reduced dc voltage applied to the motor impedance $Z_{ekv}(s)$ in case of a dc motor and, in cases of ac and step motors, it reduces a peak-to-peak, and thus rms, voltage applied to the motor impedance $Z_{ekv}(s)$.

The electric motor equivalent impedance 113 is a series connection of a resistance $R_{ekv}$ and an inductive reactance $sL_{ekv}$ in case of dc, synchronous ac, and step motors $$Z_{ekv}(s) = R_{ekv} + sL_{ekv} \tag{4}$$

while in case of an ac asynchronous (induction) motor the equivalent impedance 113 is a series connection of a stator impedance $(R_{st}+sL_{st})$ and an impedance obtained as a parallel connection of a magnetizing reactance $sL_m$ and a rotor impedance referred to stator $(R_{rs}+sL_{rs})$ $$Z_{ekv}(s) = (R_{st}+sL_{st}) + sL_m || (R_{rs}+sL_{rs}) \tag{5}$$

The transadmittance of the improved zero-impedance converter of FIG. 1, Y(s), is, for $R << |Z_{ekv}(s)|$ $$\Delta I(s)/\Delta V_e(s) = Y(s) = \Delta AK_f/\{[Z_{ekv}(s)][1+AK_eK_f] - H(s)RAK] + [1+AK_eK_f][K_m(1/sJ)G_M(s)]\} \tag{6}$$

The transfer function of the preferred embodiment of FIG. 1, for the voltage command corresponding to the input position command, i.e., $\Delta V_i(s) \rightarrow \Delta \theta_i(s)$, applied to terminal 138, is $$\Delta \theta_o(s)/\Delta V_i(s) = [T_1'(s)+T_4'(s)]/[T_1(s)+T_2(s)+T_4(s)] \tag{7}$$

where $$T_1'(s) = G_M(s)K_fAsK_i \tag{8}$$

$$T_4'(s) = G_M(s)AsK_i' \tag{9}$$

$$T_1(s) = G_M(s)K_fAsK_mK_e \tag{10}$$

$$T_2(s) = s^2JT_3(s) \tag{11}$$

$$T_3(s) = Z_{ekv}(s)[1+AK_eK_f] - H(s)RAK \tag{12}$$

$$T_4(s) = G_M(s)sK_m \tag{13}$$

A transfer function $\Delta \omega_o(s)/\Delta V_{e1}(s)$, from the input of the improved zero-impedance converter to the angular shaft speed, is $$\Delta \omega_o(s)/\Delta V_{e1}(s) = \{AK_f/[Z_{ekv}(s)][1+AK_eK_f]]\}/\{[K_m/Z_{ekv}(s)]+[sJ/G_M(s)][1-[H(s)RAK/Z_{ekv}(s)(-1+AK_eK_f)]]\} \tag{14}$$

The dynamic stiffness of the system of FIG. 1, for $R << |Z_{ekv}(s)|$, is $$-\Delta T_l(s)/\Delta \theta_o(s) = [T_1(s)+T_2(s)+T_4(s)]/T_3(s) \tag{15}$$

Denoting a part of the output angular shaft position response due to the input position command in Eq.(7) $\Delta \theta_{oi}(s)$, and a part of the output angular shaft position response due to the load torque disturbance in Eq.(15) $\Delta \theta_{ol}(s)$, the disturbance rejection ratio of the preferred embodiment of FIG. 1 is $$D_{rr}(s) = \Delta \theta_{oi}(s)/\Delta \theta_{ol}(s) = \{[T_1'(s)+T_4'(s)][\Delta V_i(s)]\}/\{T_3(s)[-\Delta T_l(s)]\} \tag{16}$$

With reference to Eq.(16) and substituting Eq.(12) the system in FIG. 1 becomes of infinite disturbance rejection ratio for the transfer function of the current feedback circuit 129 as given in Eq.(1) and repeated in Eq.(17)

$$H(s) = Z_{ekv}(s)/\{RAK/[1+AK_eK_f]\} \tag{17}$$

The condition for the infinite disturbance rejection ratio is equivalent to producing an infinite transadmittance in series with a finite transadmittance in converter, as seen by substituting Eq.(17) in Eq.(6). The infinite disturbance rejection ratio property is also equivalent to a load independence of the preferred embodiment of FIG. 1, as seen by substituting Eq.(17) in Eq.(15).

Further, the algorithm for the infinite disturbance rejection ratio, given in Eq.(17), reduces both system transfer function, given in Eq.(7), and transfer function from the input of the improved zero-impedance converter to the angular shaft speed, given in Eq.(14), to a real numbers. By substituting Eq.(17) in Eqs.(7) and (14), we obtain $$\Delta \theta_o(s)/\Delta V_i(s) = [K_fK_i+K_i']/[K_fK_mK_e+(K_m/A)] \tag{18}$$

and $$\Delta \omega_o(s)/\Delta V_{e1}(s) = AK_f/[K_m(1+AK_eK_f)] \tag{19}$$

respectively.

In a more general case in which the forward circuit 105 is characterized by a complex transfer function, e.g. $G_R'(s)$, denoting transfer a stabilizing network used in conventional systems in conjuction with block 105, the algorithm in Eq.(17) still reduces the order of the transfer function in Eq.(7), with a correspondingly reduced system dynamics with respect to the input command, and in such a case the system transfer function of Eq.(7) would become $$\Delta\theta_o(s)/\Delta V_i(s) = [G_R'(s)K_i + K_i']/[G_R'(s)K_mK_e + (K_m/A)] \quad (20)$$

The system transfer function, given in Eq.(18) or Eq.(20) depending on whether the forward circuit 105 has been characterized by a gain constant $K_f$ or a complex transfer function $G_R'(s)$, respectively, is further brought to a constant m for a direct path circuit 134 and a feedforward circuit 132 synthesized to provide constant gains as given in Eqs.(2) and (3) and repeated here in Eqs.(21) and (22)

$$K_m = mK_mK_e \quad (21)$$

$$K_i' = mK_m/A \quad (22)$$

Therefore, for the algorithms given in Eqs.(17), (21), and (22), the system transfer function becomes $$\Delta\theta_o(s)/\Delta V_i(s) = m \quad (23)$$

Since the output angular shaft position and speed are related through $\Delta\theta_o(s) = (1/s)\Delta\omega_o(s)$ and the respective position and velocity voltage commands are also related through the same integration/differentiation process, as seen from FIG. 1, it follows that a system transfer function from the velocity voltage command $\Delta V_i(s)$ to the angular shaft speed $\Delta\omega_o(s)$ is identical to the transfer function of Eq.(23), for the algorithms given in Eqs.(17), (21), and (22)

$$\Delta\omega_o(s)/\Delta V_i(s) = m \quad (24)$$

The scaling factor m in both Eqs.(23) and (24) ensures that each Volt of a corresponding voltage command produces m radians of the output angular shaft position or m radians/second of the output angular shaft speed. For example, for m = 10π in Eqs.(23) and (24), 1 Volt of the command voltage produces a five-revolution angle for the output angular shaft position or it produces a 300[rev/min] of the output angular shaft speed for any load changes within physical limitations of the system. The scaling factor m is thus dimensioned in [rad/Volt] or in [rad/sec/Volt] in Eqs.(23) and (24), respectively, as discussed previously.

From Eq.(19) it is seen that the improved zero-impedance converter, between boundaries 140-140a and 141-141a in FIG. 1, actually eliminated all time constants associated with an electric motor impedance $Z_{ekv}(s)$ as well as it eliminated any dependence in the system of a torque producing mechanisms, denoted by $G_M(s)$, and of the system moment of inertia J. By eliminating all time constants all phase lags due to the time constants are eliminated too. The system of FIG. 1 actually operates in an open-loop mode with respect to the output variables which it controls, i.e., with respect to the output angular shaft speed $\Delta\omega_o(s)$ and position $\Delta\theta_o(s)$, and so there is no any loop gain with respect to these two output variable to be discussed. Even in a general case, discussed in connection with Eq.(20), of describing a forward circuit 105 with a complex transfer function $G_R'(s)$, the zero-order dynamics is achieved and the system transfer function in Eq.(20) is made a constant m for direct path circuit 134 and feedforward circuit 132 synthesized according to Eqs.(21) and (22). Since the preferred embodiment shown in FIG. 1 is thus made of a zero dynamics and infinite disturbance rejection ratio it follows that there is no any need to provide a stabilizing network within the forward circuit 105 so that the circuit 105 is designed to provide only a dc gain $K_f$. Therefore, the preferred embodiment of the invention provides simultaneously an infinite transadmittance in series with a finite transadmittance in the converter and zero phase shift due to the object under the control, an electric motor. It can be said that, in a way, the infinite transadmittance part of the modified zero-impedance converter has been "utilized" to cancel all time constants, and thus phase shifts, associated with the object under the control, an electric motor, leaving a finite constant for a transfer function from the input of the improved zero-impedance converter to the output angular shaft speed of the motor, as shown in Eq.(19), due to the finite transadmittance part.

With reference to FIG. 1, Eqs.(19), (23), and (24) imply that the impedance $Z_{ekv}(s)$ of an electric motor has been forced to zero in that the circuit effects due to the presence of the impedance $Z_{ekv}(s)$ have been nulled out by the action of the positive current feedback loop. In this action, the positive current feedback provided a negative impedance term, $-H(s)RAK$, which cancelled out a modified motor impedance $Z_{ekv}(s)[-1+AK_eK_f]$, (or, equivalently, a negative impedance term modified by the amount of feedback of a negative voltage feedback loop in its transresistance portion, $-H(s)RAK/[1+AK_eK_f]$, cancelled out motor impedance $Z_{ekv}(s)$) so that, in a strict sense of the word, the improved zero-impedance converter is a zero-transimpedance converter where the transimpedance $\{Z_{ekv}(s)[1+AK_eK_f] - H(s)RAK\}$ is brought to zero. Eqs.(19), (23), and (24) also imply that the improved zero-impedance converter provides as well an independence to mechanical parameters variations, such as the system moment of inertia J and viscous friction coefficient variations, implying an infinite robustness with respect to the mechanical parameters. Also, an independence to mechanisms characterizing torque production in electric motors is provided, these mechanisms denoted by block 116 of transfer function $G_M(s)$.

The infinite transadmittance part of the improved zero-impedance converter should be interpreted as a zero transimpedance part of the converter and, with reference to FIG. 1, as forcing the direct path signal $\Delta V_{\epsilon 1}(s)$ applied to the input of the converter not to change while maintaining a finite and instantaneous current change $\Delta I(s)$ through the impedance of interest $Z_{ekv}(s)$, which is nulled out by a modified negative impedance term $-H(s)RAK/[1+AK_eK_f]$. Since the direct path signal voltage applied to the converter input $\Delta V_{\epsilon 1}(s)$ is a command voltage it follows that by forcing the change of this voltage to zero no corrective change of a command is needed to preserve the same value of the output variables of interest, angular shaft speed $\Delta\omega_o(s)$ and position $\Delta\theta_o(s)$, in case in which this corrective change would normally be required due to a finite impedance $Z_{ekv}(s)$ in an effectively open-loop system with respect to the output variables controlled. It turns out, as seen from Eq.(15), that the change of the command voltage signal is normally required in open-loop systems due to a finite impedance $Z_{ekv}(s)$ when load torque, acting on the drive system, changes. Therefore, the improved zero-impedance converter, with its property of infinite transadmittance portion, i.e. with its ability to force the impedance of interest to zero, forces no need for change of the command voltage signal in the open-loop system for case of load changes, yielding an infinite disturbance rejection ratio in both transient and steady state. By reducing a resistive part of a motor impedance to zero the steady state error in the angular shaft speed and position, when load changes, is zero. By reducing an inductive part of a motor impedance to zero the transient error in the angular shaft speed and position, when load changes, is zero. Physically, by cancelling all (electrical and mechanical) time constants associated with an electric motor and by cancelling a voltage drops across the resistive parts of a motor impedance, the improved zero-impedance converter provides for the load invariance in transient and steady state, respectively. The converter thus provides for instantaneously supplied motor current $\Delta I(s)$ as per load torque demand, i.e., the current necessary to instantaneously provide $\Delta T_M(s) = \Delta T_L(s)$ in FIG. 1, which, effectively, is providing an instantaneous current change through an inductance and this action is limited only by the physical properties of a physical system such as finite energy level of available sources, finite power dissipation capability of available components and finite speed of transition of control signals.

Since the electric motor drive systems are in general a control systems which are designed to follow an input position or velocity command and to do that in presence of load changes, it follows that both of these tasks are done in an ultimate way by synthesizing the system according to the preferred embodiment of this invention and without using velocity and position feedback loops, i.e., controlling the system in an effectively open-loop mode with respect to the variables under the control, shaft speed and position, and with any kind of motor including dc, synchronous and asynchronous ac, and step motors.

With regards to a circuit realization of the block 129 in the positive current feedback loop, it is seen from Eqs.(4) and (17) that the current feedback circuit 129 is realized by implementing a differentiator circuit with a dc path in case of dc, synchronous ac, and step motors, while in case of asynchronous ac (induction) motors the circuit realization of block 129 is done in accordance with Eqs.(5) and (17). Thus, the circuit realization of block 129 is simple and exactly determined by Eqs.(4), (5), and (17). Alternatively, a software/microprocessor realization, based on implementing Eqs.(4), (5), and (17), can be done. As with reference to realizing the remaining two algorithms of the preferred embodiment of FIG. 1, i.e., the feedforward circuit 132 and the direct path circuit 134, they are realized by implementing a dc gain circuits in accordance with Eqs.(21) and (22).

Various changes and modifications may be made, within the scope of the inventive concept, without departing from the scope of the inventive concept.

For example, the applications of improved zero-impedance converter to a capacitive impedance may be performed without departing from the scope of the inventive concept. In such a case, the converter would provide for an instantaneous change of voltage across a capacitive impedance. The implementation of the current feedback circuit of transfer function H(s) would call for an integration (rather than a differentiation called for in cases of inductive impedances) with a dc path (if the capacitive impedance contains a resistance in series).

As another example, the conceptual employment of the scaling constant m in the direct path circuit 134 and the feedforward circuit 132, producing for the system transfer functions the constant m, as given in Eqs.(23) and (24), may not be feasible in practical terms in cases in which this employment would cause voltage levels in the signal portion of the system higher than normally assumed, i.e., voltages at the outputs of blocks 132 and 134 would be, in those cases, higher than normally expected. This problem is easily solved by moving the scaling constant amplification portion from blocks 132 and 134 to the PWM control and power stage, where the voltage levels associated with the power portion of the system can assume the expected values. In order for this to be done, the loop gains involving the voltage gain of the PWM control and power stage 111 must, of course, be kept the same. This is easily done by dividing gain constant of block 106 with m, and dividing gain constant of block 127 with m, if the gain constant of block 111 is to be multiplied by m. Therefore, in an actual operation, the preferred embodiment of the invention, as shown in FIG. 1, may easily be changed, without affecting any of the algorithms derived here, to accommodate for reasonable voltage levels in the signal and control portion of the system, by: changing gain of the direct path circuit 134 from $K_i = mK_m K_e$ to $K_i = K_m K_e$; changing gain of the feedforward circuit 132 from $K_i' = mK_m/A$ to $K_i' = K_m/A$; changing gain of the PWM control and power stage 111 from A to mA; changing gain of the voltage feedback circuit 106 from $K_e$ to $K_e/m$; and changing gain of the buffering differential amplifier 127 from K to K/m. It can be shown that in such a case the system transfer function is $$\Delta\theta_o(s)/\Delta V_i(s) \bigg|_{\Delta V_i(s) = \Delta\theta_i(s)} = \Delta\omega_o(s)/\Delta V_i(s) \bigg|_{\Delta V_i(s) = \Delta\omega_i(s)} = mK_m/D(s) \quad (25)$$

where $$D(s) = \{[[Z_{ekv}(s)sJ + K_m G_M(s)]/G_M(s)][1 - [H(s)RA - K/Z_{ekv}(s)(1 + AK_e K_j)]] + +[H(s)RAKK_m/Z_{ekv}(s)(-1 + AK_e K_j)]\} \quad (26)$$

Substituting the algorithm of the improved zero-impedance converter of Eq.(17) yields in Eq.(26) $D(s) = K_m$ and in Eq.(25) the transfer function of interest becomes constant m, the same result as in Eqs.(23) and (24). It is readily verified that, because of unchanged loop gains in both positive current feedback loop and negative voltage feedback loop in the improved zero-impedance converter (between boundaries 140-140a and 141-141a in FIG. 1), every other property of such a system remains the same as derived before, including the property of a series infinite transadmittance of the improved zero-impedance converter and property of the infinite disturbance rejection ratio of the system employing the converter.

Also, the applications of the improved zero-impedance converter in case of inductive impedance are not limited to those described in this application (electric motor drive systems including dc motors, synchronous and asynchronous ac motors, and step motors, and without closing velocity and position feedback loops) but are rather possible in all cases in which properties of the improved zero-impedance converter, described in this application, are needed.

We claim:

1. A method for synthesizing improved zero-impedance converter comprising:
   accepting a source of electrical energy of a constant voltage at an input,
   coupling mechanically a shaft of an electric motor to a load to be driven at an output,
   controlling a power flow from said input to said output,
   modulating a power converter for the control of said power flow in a pulse width modulation manner,
   supplying a total control signal for modulating said power converter, supplying a voltage feedback signal from a voltage applied to said electric motor,
   feeding back said voltage feedback signal through a voltage feedback circuit in a negative feedback loop with respect to a direct path signal,
   passing a voltage error signal, obtained as an algebraic sum of said direct path signal and said voltage feedback signal fed through said voltage feedback circuit, through a forward circuit; thereby producing a forward control signal proportional to the algebraic sum of said direct path signal and said voltage feedback signal,
   sensing a current through said electric motor,
   feeding back the sensed current signal through a current feedback circuit in a positive feedback loop with respect to said forward control signal and summing the two signals,
   supplying said total control signal, obtained as the sum of said forward control signal and the current signal fed through said current feedback circuit, for modulating said power converter for the control of the flow of power from the input electrical source to the output mechanical load, whereby impedance of said electric motor is being forced to zero making an angular shaft speed and position independence of said load and making a transfer function from said direct path signal to said angular shaft speed a constant independence of electrical and mechanical time constants of said electric motor coupled to said load.

2. The method of claim 1 wherein said current feedback circuit in said positive feedback loop is synthesized using an equation providing transfer function in laplace domain of said current feedback circuit $$H(s) = Z_{ekv}(s) / \{RAK/[1+AK_eK_f]\}$$

in said equation $Z_{ekv}(s)$ being an impedance of said electric motor, R being a transresistance of a motor current sense device, A being a voltage gain of a pulse width modulation control and power stage, K being a voltage gain of a buffering differential amplifier, $K_e$ being a voltage gain of a voltage feedback circuit, $K_f$ being a voltage gain of a forward circuit, and s being a complex frequency laplace variable in the transfer function H(s).

3. The method of claim 2 wherein said equation providing transfer function of said current feedback circuit is physically implemented, thereby implementing said current feedback circuit, in accordance with said impedance in laplace domain $Z_{ekv}(s)$ of said electric motor.

4. A method for synthesizing electric motor drive system of infinite disturbance rejection ratio and zero-order dynamics comprising:
   accepting a source of electrical energy of a constant voltage at an input,
   coupling mechanically a shaft of an electric motor to a load to be driven at an output,
   controlling a power flow from said input to said output,
   modulating a power converter for the control of said power flow in a pulse width modulation manner,
   supplying a total control signal for modulating said power converter,
   supplying a voltage feedback signal from a voltage applied to said electric motor,
   feeding back said voltage feedback signal through a voltage feedback circuit in a negative feedback loop with respect to a direct path signal,
   supplying a velocity command obtained as a velocity voltage command or a differentiated position voltage command,
   passing said velocity command through a direct path circuit; thereby producing said direct path signal,
   passing said velocity command through a feedforward circuit; thereby producing a feedforward signal,
   passing a voltage error signal, obtained as an algebriac sum of said direct path signal and said voltage feedback signal fed through said voltage feedback circuit, through a forward circuit; thereby producing a forward control signal proportional to the algebraic sum of said direct path signal and said voltage feedback signal,
   sensing a current through said electric motor,
   feeding back the sensed current signal through a current feedback circuit in a positive feedback loop with respect to said forward control signal and said feedforward signal and summing the three signals,
   supplying said total control signal, obtained as the sum of said forward control signal and said feedforward signal and the current signal fed through said current feedback circuit, for modulating said power converter for the control of the flow of power from the input electrical source to the output mechanical load, whereby impedance of said electric motor is being forced to zero making an angular shaft speed and position independent of said load and making a transfer function from said velocity voltage command or said position voltage command to said angular shaft speed or position a constant and therefore of zero order.

5. The method of claim 4 wherein said current feedback circuit in said positive feedback loop is synthesized using an equation providing transfer function in laplace domain of said current feedback circuit $$H(s) = Z_{ekv}(s) / \{RAK/[1+AK_eK_f]\}$$

in said equation $Z_{ekv}(s)$ being an impedance of said electric motor, R being a transresistance of a motor current sense device, A being a voltage gain of a pulse width modulation control and power stage, K being a voltage gain of a buffering differential amplifier, $K_e$ being a voltage gain of a voltage feedback circuit, $K_f$ being a voltage gain of a forward circuit, and s being a complex frequency laplace variable in the transfer function H(s).

6. The method of claim 5 wherein said equation providing transfer function of said current feedback circuit is physically implemented, thereby implementing said current feedback circuit, in accordance with said impedance in laplace domain $Z_{ekv}(s)$ of said electric motor.

7. The method of claim 4 wherein said direct path circuit is synthesized using an equation providing transfer function of said direct path circuit $$K_i = mK_m K_e$$

in said equation m being a scaling constant equal to said transfer function from said velocity voltage command or said position voltage command to said angular shaft speed or position, $K_m$ being a counter electromotive force constant characterizing production of a counter electromotive force proportional to said angular shaft speed of said electric motor, and $K_e$ being a voltage gain of a voltage feedback circuit.

8. The method of claim 6 wherein said equation providing transfer function of said direct path circuit is physically implemented, thereby implementing said direct path circuit, as a constant gain circuit.

9. The method of claim 4 wherein said feedforward circuit is synthesized using an equation providing transfer function of said feedforward circuit $$K_i' = mK_m/A$$

in said equation m being a scaling constant equal to said transfer function from said velocity voltage command or said position voltage command to said angular shaft speed or position, $K_m$ being a counter electromotive force constant characterizing production of a counter electromotive force proportional to said angular shaft speed of said electric motor, and A being a voltage gain of a pulse width modulation control and power stage.

10. The method of claim 9 wherein said equation providing transfer function of said feedforward circuit is physically implemented, thereby implementing said feedforward circuit, as a constant gain circuit.

* * * * *